United States Patent [19]
Jalalian et al.

[11] Patent Number: 5,548,722
[45] Date of Patent: Aug. 20, 1996

[54] USER-CENTRIC SYSTEM FOR CHOOSING NETWORKED SERVICES

[75] Inventors: Afshin Jalalian, Cupertino; Christopher R. Bingham, Sunnyvale, both of Calif.

[73] Assignee: Apple Computer, Inc., Cupertino, Calif.

[21] Appl. No.: 137,280

[22] Filed: Oct. 14, 1993

[51] Int. Cl.⁶ ........................................... H01J 13/00
[52] U.S. Cl. ........................ 395/200.1; 395/200.06; 395/200.02; 364/DIG. 1
[58] Field of Search .................................. 395/159, 200, 395/140, 200.02, 200.66, 200.1; 364/284.4, 940.92, 940.62

[56] References Cited

U.S. PATENT DOCUMENTS

| | | | |
|---|---|---|---|
| 5,276,789 | 1/1994 | Besan et al. | 395/140 |
| 5,394,522 | 2/1995 | Sanchez-Frank et al. | 395/159 |

OTHER PUBLICATIONS

"A silver lining for chore of tracking Macintosh devices" Workgroup Computing, Nash, Jim p. 51 Jun. 22, 1992.
"Silver Cloud", Bieler, Mark, Mac User Feb. 1993 v9 n2 p. 91(2).
"Ag's Silver Cloud: User-oriented directory" Wolfe, A, Journal: Distributed Computer Monitor May 1993 v8 n5 p. 31(2).
"Macintosh Reference, System 7", Apple Computer, Inc. 1991, pp. 39–41, 125–128, 159–180.

*Primary Examiner*—Alyssa H. Bowler
*Assistant Examiner*—Krishna Malyala
*Attorney, Agent, or Firm*—Fliesler, Dubb, Meyer & Lovejoy

[57] ABSTRACT

A personal computer or workstation on a network includes a quick-choice cache into which are collected the names and aliases of networked devices or services that are expected to be most routinely used by a particular user. The cache is initialized to contain the names and aliases of devices within a network zone assigned to the workstation. This collection of names/aliases is expanded each time the user makes a connection to a device not previously listed. The cache drives a graphic user interface (GUI) that shows the user what service categories are available within the cache, and then when a service category is selected, what specific devices are included within the cache under that service category. The GUI permits quick logical connection to devices whose aliases are stored in the user's cache. A connection map later graphically shows the user what connections he or she has made.

31 Claims, 8 Drawing Sheets

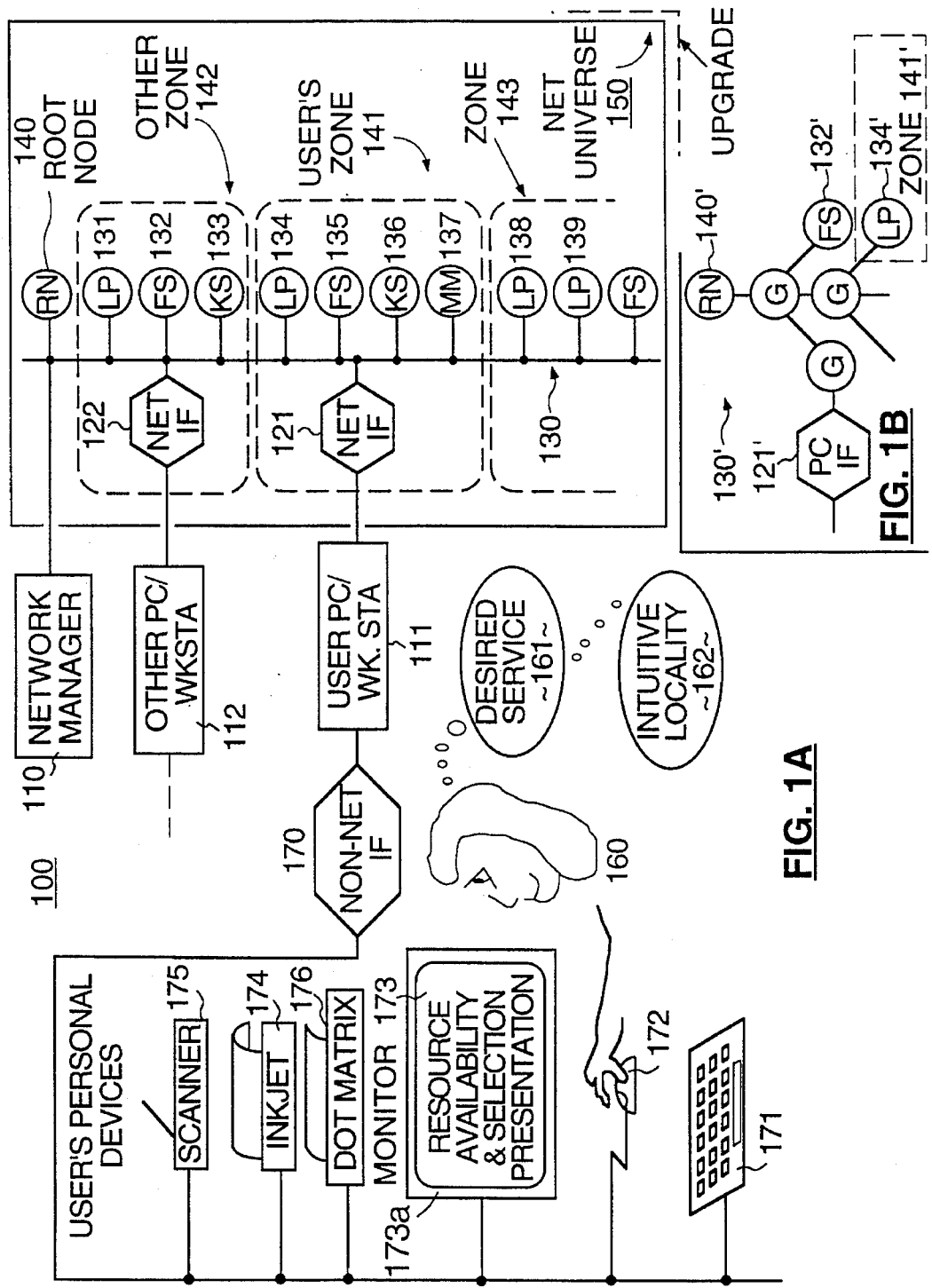

| # | Name | Connected? | Capability List Entry # |
|---|------|------------|------------------------|
| 1 | ImageWriter | No | 1 |
| 2 | Macintosh Software | No | 5 |
| 3 | Toonces | No | 4 |
| 4 | Sapphire Bullets | Yes | 2 |
| 5 | Phacintosh | No | 2 |
| 6 | Fred's Printer | No | 3 |

365

| # | Device Type | Device Class | Connected to Network? | Class Can have only one? |
|---|-------------|--------------|----------------------|--------------------------|
| 1 | ImageWriter | Printer | No | Yes |
| 2 | LaserWriter | Printer | Yes | Yes |
| 3 | AppleTalk ImageWriter | Printer | Yes | Yes |
| 4 | Keyserver | Keyserver | Yes | No |
| 5 | AFP Server | AFP Server | Yes | Yes |
| 6 | Meeting Maker Server | MM Server | Yes | Yes |
| 7 | ImageWriter LQ | Printer | No | Yes |

367

5,548,722

USER-CENTRIC SYSTEM FOR CHOOSING NETWORKED SERVICES

BACKGROUND

1. Field of the Invention

The invention is generally directed to computerized networks. It is more specifically directed to a system for navigating through a network and accessing desired network services.

2a. Reservation of Rights Beyond This Utility Patent

This document shows examples of graphical user interface (GUI) art and/or various Trademarks and/or screen ornamentations.

The original assignee of the present utility patent application claims certain copyrights, trademark rights, tradedress rights, and so forth in said GUI examples. The assignee has no objection, however, to the reproduction by others of these items if such reproduction is for the sole purpose of studying the items to understand the invention. The assignee reserves all other copyrights, trademark rights, and other such rights in the disclosed GUI examples including the right to reproduce the GUI items on a computer monitor in machine-executable form. (Mention herein of trademarks belonging to others is not intended to indicate that the assignee wishes to claim or otherwise affect the marks of others.)

2c. Cross Reference to Related Patents

The following U.S. patent(s) is/are assigned to the assignee of the present application, is/are related to the present application and its/their disclosures is/are incorporated herein by reference:

(A) Reissue U.S. Pat. No. 32,632 reissued Mar. 29, 1988 to Atkinson, and entitled, DISPLAY SYSTEM;

(B) U.S. Pat. No. 5,202,828 issued Apr. 13, 1993 to Vertelney et al, and entitled, USER INTERFACE SYSTEM HAVING PROGRAMMABLE USER INTERFACE ELEMENTS; and (C) U.S. Pat. No. 5,196,838 issued Mar. 23, 1993 to Meier et al, and entitled, INTELLIGENT SCROLLING.

3. Description of the Related Art

Computer networks offer users a wide variety of services, including but not limited to; access to numerous computer data files stored on one or more file servers, interaction with workgroup coordinating systems (e.g. meeting schedulers), access to specially-licensed software (e.g. which access is controlled by a license-key server), and use of various input/output devices such as image scanners and laser printers.

Growth-minded organizations habitually expand their networks by adding new categories of services to the networks as time goes on and by adding more capacity to each service category as demand grows.

A small company may start with a relatively small network that has attached to it only a handful of personal computers (PC's). The network may have a single laser-printer (LP) that is to be shared by the small number of PC's, and a single file server (FS) that is also to be shared by the PC's. As the company grows, it may become necessary to add more PC's to the network. At the same time it may become desirable to add more laser printers and more file servers to the network. It may become advisable to subdivide the network into zones and to assign one or more of the PC's, printers, or devices belonging to other service categories, each to a particular zone. The zones may be arranged according to physical or logical divisions of the company, such as for example, one zone for the accounting department, a second for engineering, and a third for marketing.

As the company grows even larger, it may become desirable to subdivide the network into more zones, providing perhaps multiple zones in each of the accounting, engineering and marketing departments. At the same time, it may become desirable to provide new categories of services on the network, such as conference-scheduling (which is controlled for example by a Meeting Maker™ {trademark attributed to ON Technology}) and license control (which is controlled for example by a Keyserver™ {trademark attributed to Sassafras Software}). Devices within these latter categories may also be assigned to different corporate departments or subdepartments.

In addition, it may become desirable to add non-networked, personal devices to the personal computer or workstation of certain individuals. A mail-room clerk for example, might have a special-purpose label-making device added to his or her workstation while an executive in an accounting department might have a check-writing device added to his or her workstation. These personal devices are often intended for restricted-use and are not intended to be accessible to other network users.

The above example of company growth shows how a network can expand in size and mutate in structure to offer users not only a correspondingly wider choice of devices and services, but also an ever changing route along which they must navigate to get to an available service or device. This leaves users with the problem of comprehending the scope of choices available to them, of expeditiously making choices that meet their immediate needs and of later recalling what choices they made and/or how they got there.

Each personal computer or workstation on a network (the terms PC and workstation are used interchangeably here) will typically have some mechanism installed on it for informing its user about the number and/or nature of resources available on an attached network and about the number and/or nature of non-networked resources that are otherwise available for use through the PC/workstation. Such a mechanism is referred to here as an "Availability Presentation Interface" or AVPI for short.

When a user wishes to print a document, he or she usually wants it to print on only one printing device rather than having it print out on every printing device that is on or off the network. Accordingly, each PC/-workstation typically has some mechanism installed on it for letting its user make a selective, logical connection to the specific device that is to be used, regardless of whether it is on a network or otherwise connected to the PC/workstation. Such a device-choosing mechanism is referred to here as a "Connection-Making Interface" (CMI).

Previous approaches to availability presentation and to connection-making followed a root-centric paradigm, in so far as devices on a network were concerned. The overall network was represented in terms of a root-centric topology where a real or hypothetical "root node" always served as a reference starting point. The user had to navigate along the network from the root node to a desired other node in order to inspect or connect with a networked device/service.

When a root-centric paradigm is used, the availability or nature of a device that is found at a visited node is displayed at the time of the visit and the user is presented with the option of making a logical connection to the device at the time of the visit. All availability presentation and connection-making activities consume noticeable amounts of time because the user's train of thought must direct itself to starting at the root node and then navigating along the network to the other nodes of the network.

The root-centric approach works well for persons who are working on a system-level job in which their thought pattern is constantly directed to network topology. Examples include persons working on network management or network re-design. But the same root-centric approach often fails to mesh neatly with the immediate thought patterns of network users who are performing jobs that do not have network topology as part of their main focus.

In other words, the root-centric paradigm is not "user-friendly" to users who are working on a task that is not root-centric. Consider for example, a case where a person working in a subdivision of the corporate accounting department wishes to query a database stored in a file-server of the accounting department and who further wishes to print out the results of the database query. This person is not interested in learning about the topological details of the network to which the file-server and printer are connected. Such root-centric details have little to do with his or her immediate job function. Yet in a root-centric system, this person is forced to keep informed of all network topology changes just so he or she can navigate from the root node to the desired file-server and printer for the purpose of choosing each device and using it to complete a thought-intensive project that has database inquiry rather than network mapping as its prime focus.

A need exists for a different kind of approach, where the availability presentation interface (AVPI) and connection-making interface (CMI) of each PC or workstation is tailored to meet the immediate needs of each individual user rather than being root-centric.

SUMMARY OF THE INVENTION

The invention provides a system having a service-oriented, user-centric, availability presentation interface (u/c AVPI) and a user-centric, service-typed, connection-making interface (u/c CMI).

A system in accordance with the invention includes a user-centric, service-category cache (SCC) for presenting to each user a list of service "categories" or service "types" that are likely to be of particular interest to that user and are available to the user through the network or otherwise. Examples of such service "types" include, laser-quality printing, file-serving and key-serving.

The list of service categories contained in the service-category cache (SCC) is automatically initialized when a user's workstation is first connected to the network or reset so that the list reveals to the user only those service categories that are provided by the user's personal, non-networked devices and only those service categories that are provided by networked devices that are logically located within the user's assigned portion (zone) of the network. A person working in the accounting department for example, would be automatically presented with a list of service types available within the accounting zone alone.

The service-category cache (SCC) is automatically expanded by user activity. Each time the user makes a connection (by way of a below described "Browse", choose-and-connect operation or by way of a below-described "Find", choose-and-connect operation) to a device that belongs to a service category not yet listed in the service-category cache (SCC), the unlisted service category is added on. The user can manually modify the contents of the service-category cache (SCC) by trimming away (trashing) representations of rarely-used service categories. Over time, the service-category cache (SCC) evolves to one that provides quick-access to those types of services that are most routinely used by the user.

The service-category cache (SCC) preferably drives a graphical, availability-presentation-interface (gAVPI). The gAVPI presents each service category as a graphical icon. Each service category icon in the gAVPI can be activated with a mouse or other graphic input device to reveal a corresponding, service-typed and user-centric, connection-making interface (u/c CMI).

When activated, the u/c CMI shows a collection of available devices that satisfy the corresponding service category definition of the invoking service-category icon in accordance with the contents of the corresponding service-category cache (SCC). Thus, if a person working in the accounting department for example, has just attached his workstation to the network and has for the first time activated in the gAVPI, a service category icon representing "laser-quality printing"; he or she would be next presented with a list of laser-quality printing devices that are available within the accounting zone alone or attached in a non-networked fashion to that user's workstation. As time goes on, the displayed collection of available devices would be modified to include other devices of the same service category to which a connection was previously made by the user and to exclude devices for which the user has indicated that he or she does not wish to routinely connect to.

A user-centric, service-typed, device-choosing cache (DCC) is provided within the user's workstation for maintaining a list of device choices to be displayed for each activation of an invoking service-category icon. Each service category (including non-networked service categories) is assigned its own device-choosing cache.

Each device-choosing cache (DCC) is automatically initialized the first time the workstation is connected to the network or when the workstation is reset so that the device-choosing cache (DCC) will contain only those devices of the corresponding service category that are available within the user's assigned portion (zone) of the network or are attached to the user's workstation in a non-networked fashion. Additions to this list are made automatically as the user visits and connects to each new device, the device being one that is either on or off the network. Deletions to the device-choosing cache (DCC) can be made manually by the user so that the user can pare the list to suit his or her personal desires.

A "Browse" function is included at the service-category selecting level and the device choosing level for giving users the option to randomly browse through the network to respectively locate desirable service-types or desirable devices within a service category. A "Find" function is also included at the service-category selecting level and the device choosing level for giving users the option to more selectively search through the network for service categories or devices having specific name patterns. The user can make a connection to a device that is found by way of the browse or find function, and that device (and its corresponding service category if not already logged) is then automatically added to the related device-choosing cache (and its service category is added to the corresponding service-category cache where necessary).

A "connection-map" function is also included for displaying to the user all the various device connections that he or she has made to networked or non-networked devices. This allows the user to see in one snapshot, all the connections that he or she has made to various networked and non-networked devices.

The above summarized system provides users with a relatively quick and intuitive way of accessing networked and non-networked resources that are most likely to be of interest to that user. This is so because a user generally thinks first in terms of a desired service category rather than in terms of network topology or in terms of a specifically desired device when the user wishes to have the service performed.

For example, when a user wishes to print out a document, the user first thinks "I want to print out this document" and not, "I want to first navigate through the network to zone 8 and then select printer number 12 of that zone and then finally ask that device to print my document." It is only after the user has selected a service category such as "printing" that the user begins to think about the specific device (e.g. laser printer, dot matrix printer, daisy wheel printer) that is to provide the desired service. And even then, if the device is thought of by the user as being local or personal, the user does not wish to have to point to the device in a root-centric manner.

Thus, it is more intuitive for the user to be presented first with a choice of service categories and thereafter with a choice of devices within a selected service category. And since it is more likely than not, that the user will want to restrict his or her device choice-making actions to devices that are conveniently located near his or her workstation, it is advantageous to display a choice of those service-typed devices that are assigned to the same portion (zone) of the network that has the user's workstation also assigned to it. If these do not satisfy the user's desires, the user is asked to go "further" to a Browse or Find menu perhaps, in order to point to devices that are psychologically speaking, more distant.

Over time, the user may develop a preference for certain particular devices and a dislike for other particular devices. The user would then wish to delete disliked devices from his or her choice list and retain only the favored devices. Some of the favored devices may be outside the user's official "zone", but the user will come to think of them as being within his or her psychological zone due to repetitive use and familiarity.

The above-summarized system meshes in a self-reinforcing way with a user's notion of what services/devices are, psychologically speaking, close or personal to him or her and what services/devices are further away. Services and/or devices that can be connected to rather quickly (using the quick-choose process described in more detail below) are perceived as being psychologically close and conveniently at hand while services/devices that require a laborious browse through the topology of the network are perceived as being psychologically far away and irrelevant. Thus the system provides each user with a user-friendly and relatively intuitive representation of services/devices that are available either through the network or through other pathways.

Other features of the invention will become apparent from the below, detailed discussion.

BRIEF DESCRIPTION OF THE DRAWINGS

The below detailed description makes reference to the accompanying drawings, in which:

FIG. 1A is a block diagram of a non-hierarchial networked system in accordance with the invention;

FIG. 1B shows an alternative, hierarchial network that can be used in the system;

FIG. 3B shows an internal structure of the connection map module;

DETAILED DESCRIPTION

Figure 2A:
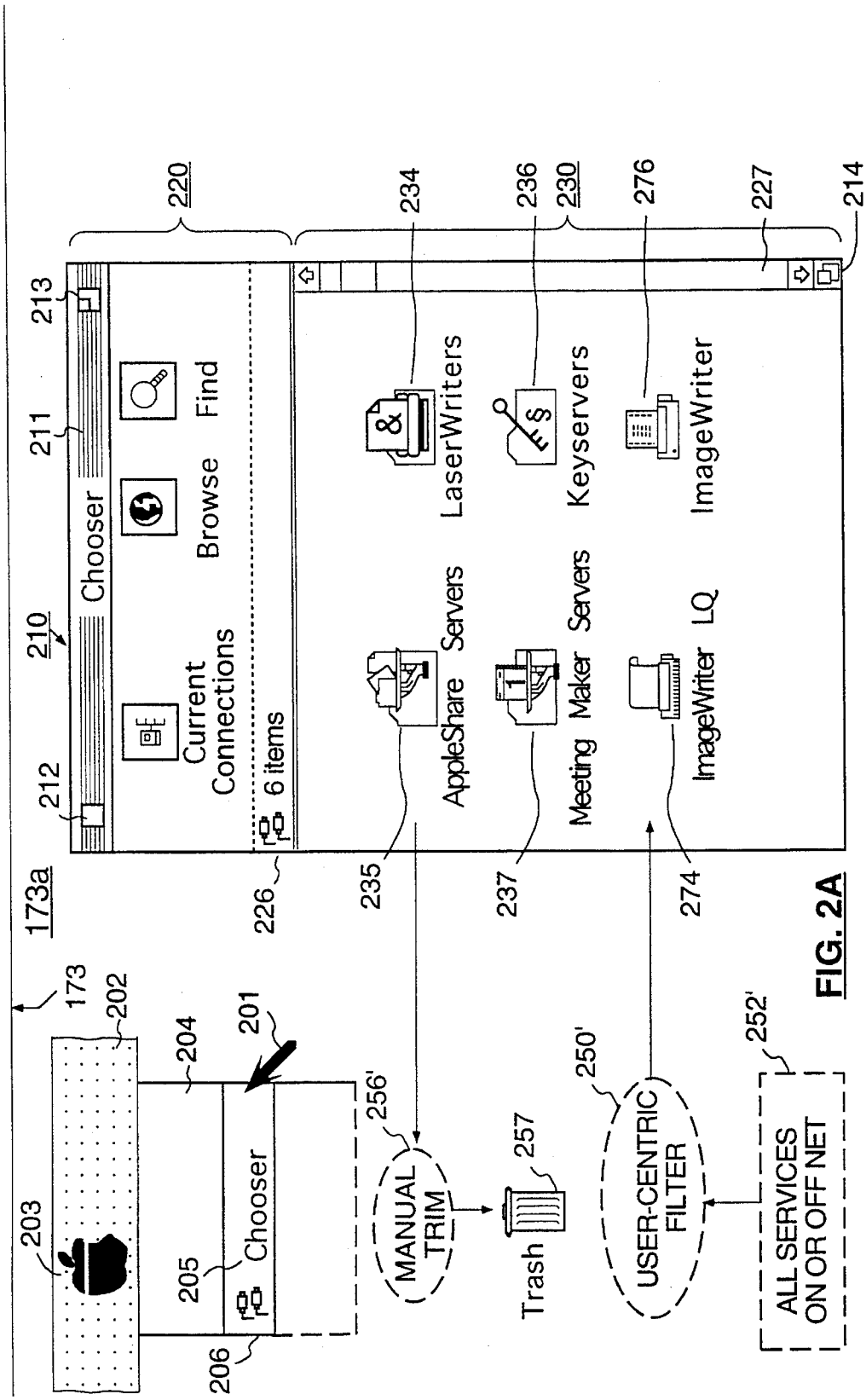
FIG. 2A shows a choice-making menu displayed on a quick-choose system in accordance with the invention.

FIG. 1A is a block diagram of a networked system 100 in which two or more personal computers 111, 112, etc., (or workstations 111, 112, etc.; the terms PC and workstation are used interchangeably here) are connected by way of respective network interfaces 121, 122, etc., to a network 130.

The network 130 can be of any suitable type, such as a local-area network (LAN), or a wide-area network (WAN) or a metropolitan-area network (MAN) or a hybrid of these, and so forth. Any suitable communications protocol can be used including Ethernet and token ring.

A plurality of user-shared resources 131, 132, etc., are provided on the network 130 for shared use by the plural workstations 111, 112, etc. These shared resources can include, but are not limited to, a plurality of laser printers (LP's) 131, 134, 138 and 139. The laser printers 131, 134, 138, 139 can vary in their respective size, speed, resolution or other print capabilities.

The shared resources of network 130 can also include one or more file servers (FS) 132, 135, etc. As understood by those skilled in the art, a file server is a mass storage device used for storing voluminous amounts of computer data and providing full or privileged access on a time shared basis to requesting clients.

The shared resources of network 130 can further include one or more key servers 133, 136. As understood by those skilled in the art, a Keyserver™ is used for controlling access to licensed material. By way of example, a particular software package may be licensed for use by no more than five users at a time. Each user who wishes to use the software package must first request one of five non-reproducible keys from the Keyserver™. Once the five keys have been allocated out, no further users may access the software package until one of keys is returned.

The shared resources of network 130 may further include one or more meeting schedulers such as Meeting Maker™ (MM) 137. A meeting scheduler keeps track of available time slots for different people and different conference rooms. It is used to organize a meeting among a group of people at a convenient time and place.

Although not shown, the following nonexhaustive list of additional services may be found on network 130: (a) e-mail delivery and tracking services (which not only deliver electronic mail to addressed recipients, but also inform senders about the status of the process, e.g., if and when the mail was delivered, if and when it was read, etc.); (b) networked database search and/or browse services; (c) stock-price quoters; (d) over-the-wire shopping services; (e) other over-the-wire or wireless-remote transaction services; and so forth.

The network 130 of networked system 100 can be organized according to a variety of different topologies. FIG. 1A shows a flat topology in which all the shared resources 131, 132, etc., are deemed to reside on a single level. This level is subdivided into "zones". Each zone contains one or more workstations (111 or 112) and one or more shared resources.

A network manager 110 is coupled to the network 130 for defining the allocation of different workstations and resources to different zones and their positionings within each zone. In the illustrated example, workstation 111 has being assigned to zone 141 together with laser printer 134, file server 135, Keyserver™ 136 and Meeting Maker™ 137. Workstation 112 has been assigned to zone 142 together with laser printer 131, file server 132 and Keyserver⌒ 133. Other network resources such as 138, 139 are contained in further zones such as 143. The topology of network 130 and its subdivision into various zones is subject to change at the discretion of the network manager 110.

The combination of all zones 141, 142, etc., defines the network universe 150. This network universe 150 can be modified in several ways including, adding new workstations or shared resources to a particular zone, or creating a new zone having new workstations and shared-resources, or modifying the network topology.

FIG. 1B shows an alternate network 130' having a tree topology. To access a shared resource in such a topology, users typically have to first navigate from their local position on the tree (e.g. from interface point 121') down to a root node (RN) 140' and then to navigate back up the tree from the root node 140' through a series of gateways (G) to a desired resource (e.g. laser printer 134').

A similar navigating scheme is required for accessing each shared resource of the flat network topology shown in FIG. 1A. Each shared resource 131, 132, etc., on network 130 is assigned a unique "alias" by the network manager 110, as referenced against a hypothetical root node 140. An alias of the form: "/root/zone141/dev136" is used to define the steps of: starting at root node 140, navigating through zone 142 to get to zone 141 and thereafter navigating to the third device (key server 136) in zone 141.

A user 160 is shown in FIG. 1A interacting with workstation 111 in real time by way of a keyboard 171, a mouse 172 and a monitor 173. These personal I/O devices 171-173 are linked to the user's workstation 111 by way of a non-network interface 170. The user 160 may have additional, personal I/O devices such as an ink jet printer 174, and an image scanner 175, and a dot-matrix printer 176, coupled to his or her workstation 111 by way of interface 170. Personal devices 171-176 are not accessible to other users of network 130.

A problem develops when the user 160 wishes to perform an input/output function using either the network resources 131, 132, etc., or non-networked personal resources such as devices 174-176. The problem can be subdivided into at least two parts: (a) How to make user 160 aware of the sharable resources 131, 132, etc., available on the ever-expandable network 130, and (b) How to provide user 160 with expeditious access to the resources that best meet his or her needs. A further, independent problem is: (c) How to remind user 160 of the logical connections he or she made to various non-networked and networked devices in an easily understood way.

In the past, users 160 were left to their own resourcefulness, each time they wished to perform an I/O function, as to how best to navigate across the branches of network 130 or 130' (from one node to the next) as they searched for a networked resource that would meet their (the user's) I/O needs. Network navigation became a source of frustration for users 160. It diverted their mind away from the main task at hand (which was something other than navigating through network 130). It consumed excessive time. And it often left users 160 unsure of what device they were looking at as they navigated through a large-scale network 130 or 130'.

The present invention provides a more user-friendly interface. Part of the interface comes in the form of a Resource Availability and Selection (RAS) presentation 173a that appears on the user's monitor 173. This Resource Availability and Selection (RAS) presentation 173a initially limits its informational content to a presentation which takes into account a desired category of service 161 immediately desired by the user 160 and the user's intuitive appreciation 162 of where the user 160 is located (psychologically speaking) relative to available resources.

FIG. 2A shows an example of such a RAS presentation 173a. This RAS presentation 173a conforms in general to the Macintosh™ graphical user's interface (GUI) that has been developed over the years by Apple Computer, Inc. of Cupertino, Calif.

A pointing icon such as arrowhead 201 traverses across the screen of monitor 173 in accordance with user movement of mouse 172 (FIG. 1A) or another appropriate input device (e.g., a trackball, not shown). Mouse 172 has one or more activation switches which may be clicked by the user 160 one or more times, with or without concurrent movement of the mouse across a desktop surface, to initiate activities by the user's workstation 111. A headline menu bar 202 is displayed at the top of monitor 173 and shows a number of activation areas for activating basic functions such as file access and machine configuration. One of the basic-function, activation areas is identified by an icon 203 such as an apple symbol or the like. (The illustrated apple symbol is a recognized trademark of Apple Computer Inc.)

Pointer icon 201 is brought over activation icon 203 and a switch on mouse 172 is clicked to bring down a roll-away menu 204. This roll-away menu 204 lists a number of possible options including the selection of a so-called "Chooser" function 205. An associated graphical symbol 206, such as one depicting a pair of wire connectors, is placed adjacent to the "Chooser" name 205 to indicate that this function is used for creating communication connections between the user's workstation 111 (FIG. 1) and external devices.

When the user 160 clicks on the Chooser selection 205 of menu 204, menu 204 rolls away behind top bar 202 and a "Quick-Chooser" control panel 210 is painted onto a predefined portion of the monitor screen (173a), covering any underlying graphics that may have been there before. This Quick-Chooser control panel 210 is not to be confused with the Chooser control panel that had been previously offered on Macintosh™ products such as System 7.0™ of Apple Computer, Inc.

Those familiar with the older Chooser product will note a few similarities though. A drag bar 211 is provided at the top of the Quick-Chooser control panel 210. The word "Chooser" is imprinted in the middle of the drag bar 211 to reinforce in the user's mind that he or she has chosen the "Chooser" function of roll-away menu 204. When a click-and-drag operation is performed on mouse 172 while pointer 201 is over the drag bar 211, the Quick-Chooser control panel 210 is correspondingly dragged across the screen of monitor 173. Clicking on a close box 212 provided at a left edge of the drag bar 211 collapses the Quick-Chooser control panel 210 and refreshes the screen with whatever was painted in that area beforehand. Clicking on the zoom (maximize) box 213 provided at a right edge of the drag bar 211 expands the size of the Quick-Chooser control panel 210 to occupy the maximum size available on the screen. A panel-size adjustment box 214 provided at a bottom right corner of panel 210 lets the user adjust the vertical and horizontal dimensions of panel 210 as desired using a click-and-drag operation by mouse 172.

The Quick-Chooser control panel 210 is vertically subdivided into an upper pane 220 and a lower pane 230.

The upper pane 220 includes three activation buttons respectively labeled "Current Connections", "Browse" and "Find". The bottom ledge of upper pane 220 includes a reinforcement icon 226 similar to the associated graphical symbol 206 that appeared in the roll-away menu 204. This is used for reinforcing in the user's mind the idea that he or she is operating within the Quick-Chooser function. The bottom ledge of pane 220 further includes an introduction marquee that indicates of the total number of items (e.g., 6 items) that may be viewed within the lower pane 230, with or without scrolling.

The lower pane 230 of the Quick-Chooser control panel 210 functions as a scrollable window which allows the user 160 to view at least a portion, if not all, of a plurality of choosible items 234-237 and 274-276. Sidebar 227 controls the scrolling function of lower windowpane 230 in accordance with standard Macintosh™ GUI protocol.

The choosible items of lower pane 230 are subdivided into two broad categories, networked and non-networked. The higher-displayed items 234-237 represent networked service categories. The lower-displayed items 274-276 represent non-networked devices.

Reference numerals 234-237 and 274-276 are chosen to correspond with reference numerals 134-137 and 174-176 of FIG. 1A, but it is to be observed that although each of items 134-137 and 174-176 in FIG. 1A has been represented above as being a singular device, it is henceforth to be thought of as representing one or more devices of like type. Item 134 for example, is now to be thought of as representing one or more laser printer devices rather than just one such printer.

Note that choosible item 234 is represented by a folder-icon having a printer-icon contained within its borders and that the type-definition, "LaserWriters" is imprinted directly beneath. This item 234 represents a collection of next-choosible devices that provide a service described by the term "LaserWriters".

Figure 2B:
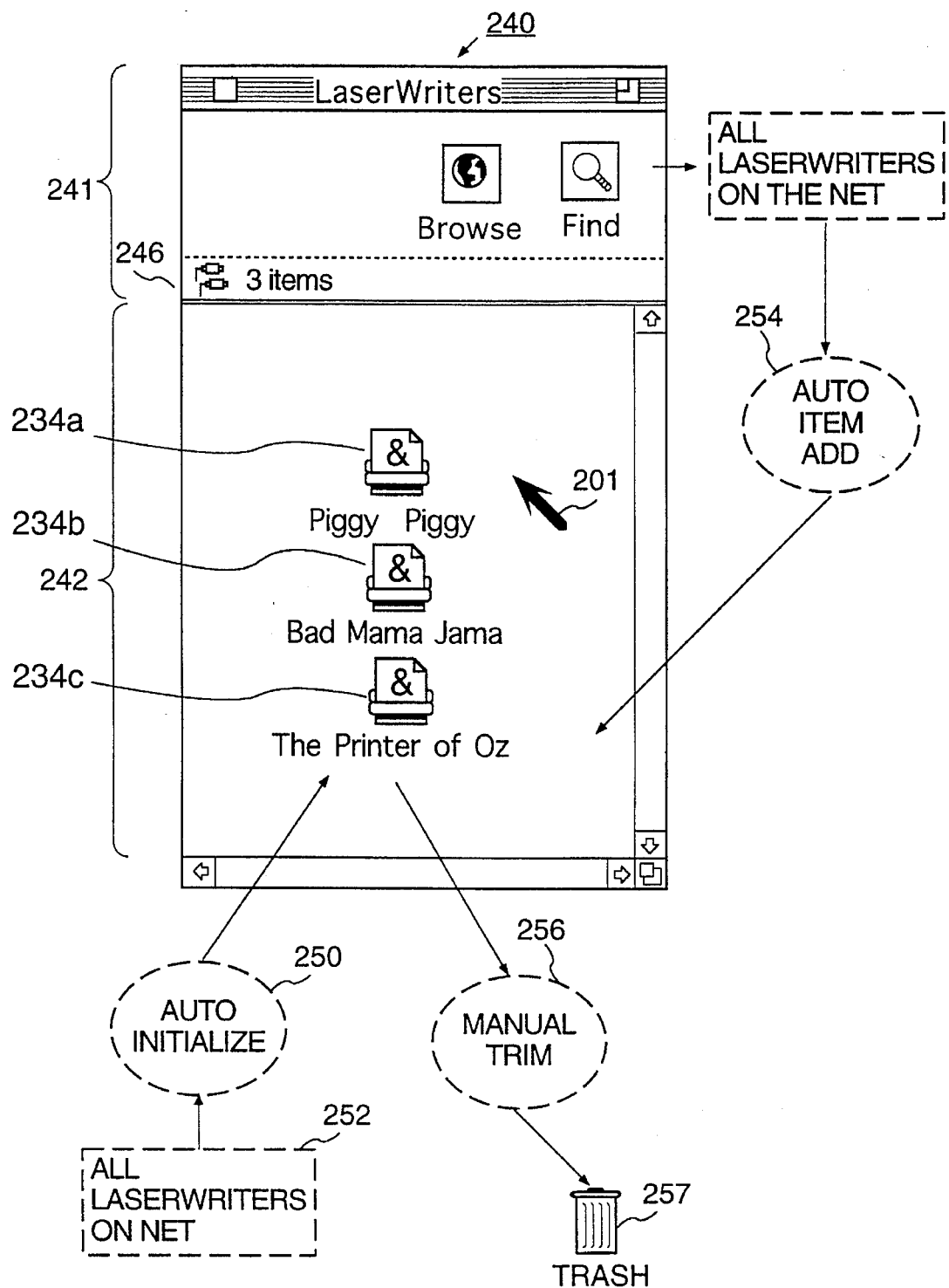
FIG. 2B shows a secondary selection menu that is presented after a networked printing category is selected in the menu of FIG. 2A.

Double-clicking on item 234 opens up a secondary choice panel 240 such as shown in FIG. 2B. This secondary choice panel 240 is labelled "LaserWriters" in the middle of its drag bar 211 to reinforce the notion that the user has opened up the "LaserWriters" service category.

Like the Quick-Chooser control panel 210, the secondary choice panel 240 is vertically subdivided into upper and lower panes 241 and 242. Upper pane 241 contains a Browse button, a Find button, a reinforcement icon 246 for reinforcing in the user's mind that he or she is still in the Quick-Chooser function and an indication of the number of items appearing in the window of lower pane 242. Standard Macintosh™ interface functions such as panel close, panel drag, panel maximize, panel sizing and window scrolling functions are also provided.

Representations for three choosible devices 234a, 234b and 234c are shown in the lower pane 242 of the illustrated, LaserWriters choice panel 240. Each representation 234a-234c includes a graphical icon representing a particular laser printer and a specific name associated with that particular LaserWriter. The user may click on any one of presentations 234a-234c, using mouse 172 in conjunction with pointer 201, and the user may thereby define the chosen printer as the printer to be used by a currently-executing, or next to-be-executed, application program.

It is to be observed that the contents of the lower pane 242 are filtered such that, rather than showing all laser printers on corresponding network 130, only a "user-centric" subset of those LaserWriters is shown in pane 242.

This "user-centric" subset is defined as follows. When the user's workstation 111 is first connected to the network 130 (or when the user resets his or her workstation to a state similar to that found the first time the workstation is connected to the network), a Chooser-initialization module (or program) 310 within the workstation 111 (see FIG. 3A) queries the network manager 110 in a background mode to determine what zone (e.g. 141 or 142) this particular workstation 111 is assigned to and what network resources 131, 132, etc., (see FIGS. 1A, 1B) are assigned to the same zone. In the illustrated example of FIG. 1A, the Chooser-initialization module 310 will find found that the user's workstation 111 is assigned to zone 141 and services such as laser printing 134, file serving 135, key serving 136 and meeting scheduling 137 are available within that zone 141.

The Chooser-initialization module 310 also queries the non-network interface 170 in a background mode (one that the user is not made aware of) to see what non-networked services or devices are available to the user's workstation 111.

In the illustrated example of FIG. 2A, the Chooser initialization module 310 (FIG. 3A) has found that there are four networked service categories available in the user's zone: laser-printing 234, file-serving 235, key-serving 236, and meeting-scheduling 237. Each of these service categories has been found to have more than one device within it that resides within the user's zone 141. Accordingly, a folder-icon or other containerizing-icon (not shown) is drawn about the representative icon of each corresponding service to indicate that the user must go one level deeper and that a plurality of devices may be chosen amongst in that deeper level.

If there had been only one device available within a given service category (e.g., one key server), then a graphic icon for the singular device would have been shown directly in lower pane 230, without a surrounding folder-icon, to indicate that the user does not have to go one level deeper to make a logical connection to that device. Momentarily assume for this example that a folder-icon is not drawn about the "key" icon of item 236. This non-containerization of the key icon would indicate to the user that there is only one device in that particular service category (e.g., key-serving) and that the device may be chosen immediately, without having to go one level further in the navigation through menus. The user would simply double-click on the icon that represents the merger of the service category and service-providing device to initiate a connection operation.

Note that while the example of FIG. 2A shows an availability of four networked services (file-serving, laserprinting, meeting-scheduling and key-serving), the Quick-Chooser control panel 210 could have opened up without showing one or more of these service categories. The absence of a service category from the Quick-Chooser control panel 210 indicates that such a service is not within the quick-choose capability of this workstation 111 (FIG. 1A). That does not mean that the user cannot access the unshown service category. Rather it means the user cannot access the unshown service category immediately from the Quick-Chooser control panel 210 or a secondary choice panel 240 (see FIG. 2B). The user will have to use the Browse function, or the Find function or some other long-winded function in order to identify and connect to a device in the desired service category. The Browse and Find functions scan through the network 130 to determine the aliases of target devices. This takes more time than having the aliases immediately available in a quick-choose cache.

Note further, that although FIG. 2A shows an availability of four networked services, there could be other services (such as Clip-Art serving for example, or stock-price quoting and so forth) available on the network 130 but not within the user's official or psychological zone. Icons for these other services do not initially show up on the user's Quick-Chooser panel 210. They may be added on later, however, using one of the Browse or Find functions of upper panel 220.

In addition to the four networked services 234-237, the Chooser-initialization module 310 (FIG. 3A) has found in the illustrated example of FIG. 2A that there are no more than two personal devices attached in a non-networked manner to the user's workstation 111: a letter-quality (LQ) ImageWriter™ 274 and a regular ImageWriter™ 276 (these are dot matrix printers available from Apple Computer, Inc. of California). It is assumed in the example of FIG. 2A that the image scanner 175 and inkjet printer 174 of FIG. 1A are not present. Both of items 274 and 276 belong to the non-networked service category of dot-matrix printing. If there had been three or more such print service devices, rather than just two, a folder would have been created for containerizing the representations of these devices and that folder would have been labeled "ImageWriters" or "Dot-Printers". However, since there are only two, and they are devices which will probably be most often chosen by the user, no folder is created and the user is given the ability immediately choose either device 274 or device 276 as his or her active printer without having to click into a further menu.

Standard Macintosh GUI operations such as drag-and-drop are preferably supported in every panel (e.g., 210 of FIG. 2A and 240 of FIG. 2B) so that users can choose among alternative methods for achieving a desired result, based on what is more intuitive to the user.

Thus, when panel 210 (FIG. 2A) is open, a user can create a new folder (or other containerization-representing icon) within lower pane 230. The user can thereafter drag-and-drop loose items such as 274 and 276 into the new folder if desired and give the new folder a desired service category name (as long as the new name doesn't conflict with pre-existing names for service categories).

The user can also go the other way, and de-containerize device choices that he or she does not want to be containerized within lower pane 230. For example, if there are only two key-servers inside folder 236, the user may double-click on that folder to open it, drag the underlying choices (which will appear in a secondary choice panel 240 such as shown in FIG. 2B) to a nonoccupied area of lower pane 230 (FIG. 2A), drop the dragged items there. This operation will empty the folder from which the dragged-out items came. Thereafter the user can discard the empty folder into trash-icon 257. Then, when the Quick-Chooser control panel 210 is later reopened, the de-containerized items will appear individually within lower pane 230 rather than being containerized within a folder.

Also, desktop rearrangement is available for any item (e.g., 234-276) shown in lower pane 230 of FIG. 2A or for any item (e.g., 234a-234c) shown in lower pane 242 of FIG. 2B. A user can rearrange the placement of items by dragging them to new positions and the new position will be used when the corresponding Quick-Chooser control panel 210 or 240 is later reopened.

Drag-and-drop GUI operations are preferably also made available for items shown in the lower pane 242 of the secondary choice panel 240 (FIG. 2B). The user can discard unwanted items into trash-icon 257 as indicated by the manual-trim operation 256. The user can create a new folder (or other containerization-representing icon) within lower pane 242. The user can thereafter drag-and-drop selected items such as 234a and 234b into the new folder while leaving another item, e.g., 234c out as desired, and give the new folder a desired choice-collection name (as long as the new name doesn't conflict with pre-existing names for other collections of choosible items in the same secondary choice panel 240). Folders can be inserted into other folders to create multiple levels of openings if desired. And these multiple levels can be undone at a later time.

Also, if a new item belonging to the service category of the opened secondary choice panel 240 is shown in a third window (e.g., in a browse results window such as 245 of FIG. 4B), that item can be dragged and added to the collection shown in the secondary choice panel 240 (FIG. 2B). This manual operation will be in place of the auto-add function 254 which is also described herein, and a corresponding device-choosing cache (331, see FIG. 3A) will be automatically updated with each drag-and-drop addition of a new device to the Quick-Chooser secondary control panel 240. A user can therefore do a manual item-add rather than letting the system perform an automatic item-add (where the latter occurs when the user connects to a selected device/service).

The environment for these types of GUI operations can be understood in more detail by referring to FIG. 2B. Assume that after viewing the Quick-Chooser primary control panel 210 of FIG. 2A, the user has double-clicked on the graphic icon 234 for "LaserWriters". The secondary Quick-Chooser choice panel 240 is now painted onto the screen of monitor 173 to present the user with a choice of a first LaserWriter 234a named "Piggy Piggy", or a second LaserWriter 234b named "Bad Mama Jama", or a third LaserWriter 234c named "The Printer of Oz". This limited field of choices was created by one or more of the following four functions: (a) a choice initialization function that is represented by the dashed ellipse 250, which ellipse is not part of the display; (b) a choice auto-expansion function that is represented by the dashed ellipse 254, which ellipse is also not part of the display; (c) a choice contraction function that is represented by the dashed ellipse 256, where the ellipse is again not part of the display; and/or (d) a manual drag-and-drop addition as described above. The set of all LaserWriters available on the network is represented by dashed box 252 which is not part of the display. The trash-icon 257 is part of the display.

The choice initialization function 250 is performed in the background, either the first time the user's workstation 111 is attached to the network 130 or when the user resets his or her workstation 111. The choice auto-expansion function 254 is also performed in the background, while in the foreground, the user 160 executes a Browse or Search through all LaserWriters on the network and then makes a connection to one or more of the visited devices. An icon 234d (not shown) that represents the newly-connected to LaserWriter is added into pane 242 after the user makes the new connection. The choice contraction function 256 is preferably carried out in the foreground. The user 160 clicks on the icon representing a device 234a-234c that he or she no longer wishes to have among the quick-choices and drags that icon into trash can 257. The next time the secondary choice panel 240 is re-opened, the trashed item will no longer appear among the choices. If desired, an automatic choice contraction function may also be added to delete the icons of devices that are not chosen over a prolonged period of time such as six months or longer.

Figure 3A:
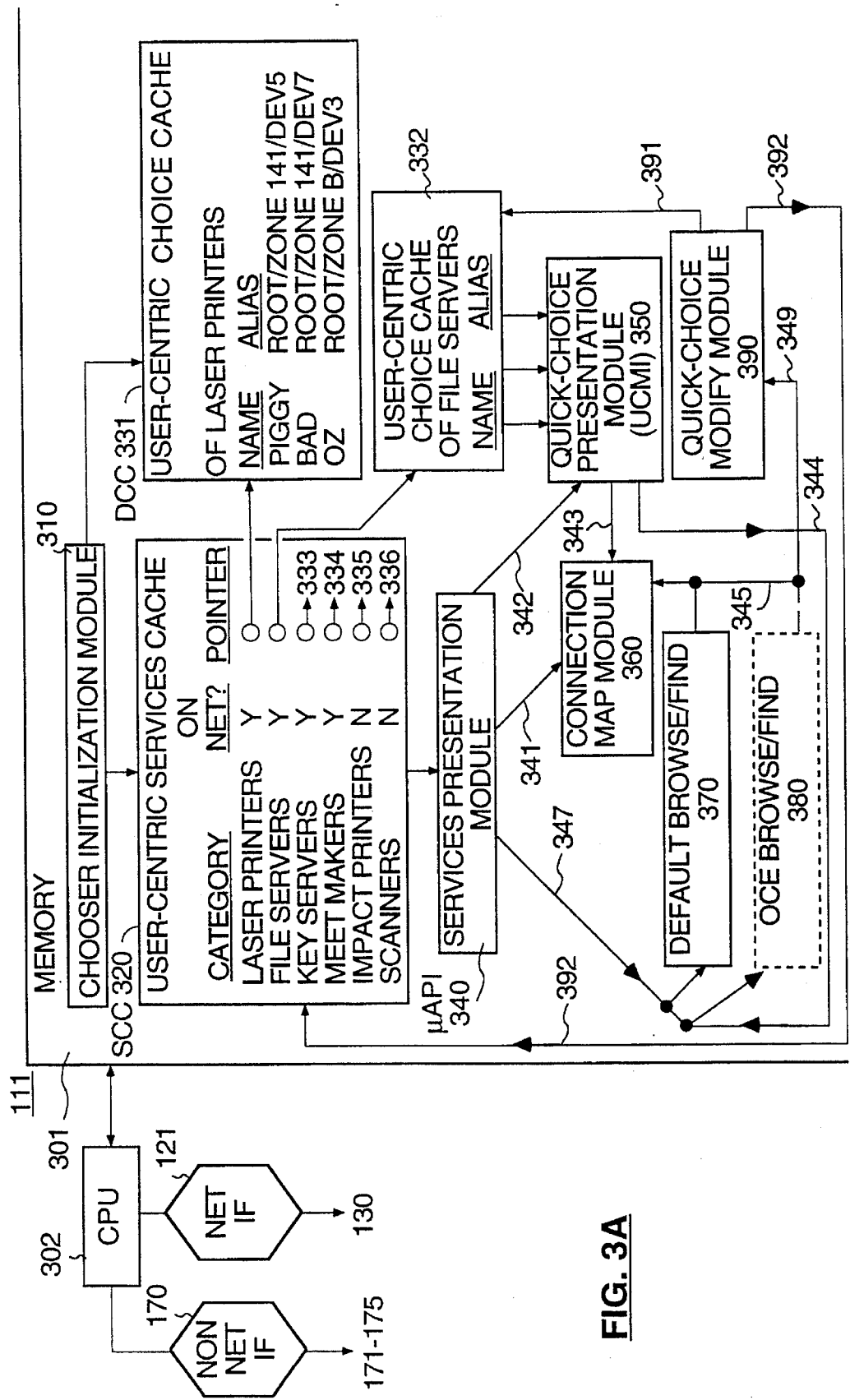
FIG. 3A is a block diagram of a user workstation that supports the quick-choose operations and connection map operations of the invention.

FIG. 3A shows an example of the internal structure of a workstation 111 that carries out the above-described presentations. The workstation 111 includes a memory unit 301 for storing data electronically magnetically, optically or otherwise. A central processing unit (CPU) 302 or other data processing device is operatively coupled to the memory unit 301 for executing instructions defined by execution modules shown within the box representing memory unit 301 and for generating the data structures also shown within 301. The CPU 302 is also operatively coupled to the network interface 121 for communicating with network 130. CPU 302 is further operatively coupled to the non-network interface 170 for communicating with personal devices 171-176.

A Chooser initialization module 310 within workstation 111 is activated either the first time that workstation 111 is attached to network 130 or when workstation 111 is reset. The Chooser initialization module 310 can be either a computer program or a hardware circuit that queries the non-network interface 170 in the background (without the user's awareness) to determine the service categories available through the non-networked interface 170 and the number of devices in each service category. Module 310 then generates a service category cache (SCC) 320 within memory unit 301. The Chooser-initialization module 310 then enters the name of each so discovered service category (e.g., impact printers, scanners, line printers, etc.) into the service category cache (SCC) 320 together with an indication ("N") of that this service category is available through the non-network interface 170 rather than through the network interface 121, and a pointer pointing to a corresponding device-choice cache (DCC) 331-336.

A separate DCC is generated for each service category listed in the service category cache 320. Thus, the first service category for non-networked impact printing will have a first DCC 335 generated for it and the second service category for non-networked image scanning will have a second DCC 336 generated for it. Each DCC 331-336 includes a name definition for defining a human-recognizable name of a particular device and an alias definition for defining a machine-recognizable alias pointing out the position of the specific device on the network 130. Each DCC 331 can have references to more than one device belonging to its corresponding service category.

The DCC's 331-336 are characterized here as being "user-centric" because they provide aliases to only a subset of all networked and non-networked devices. The subset references those devices which are psychologically close to the user's workstation 111 while excluding those devices that are psychologically distant from the workstation 111.

The term "psychologically close" is used here to refer to how the user 160 perceives the devices irrespective of their physical location. Physical proximity can play a role in defining what the user considers as psychologically close, but it doesn't have to. The user will tend to preferentially use printer and scanners that are physically close to his or her workstation 111 and will therefore consider those devices as being psychologically close. The physical location of file servers will not be as important. Routine usage of such servers rather than their physical proximity will lead to a perception that these devices are psychologically close.

Generally speaking, most if not all of the personal devices 171-176 that connect in a non-network fashion to the user's workstation 111 will be considered psychologically close, and as such, each will be referenced in a DCC (335-336).

In addition to identifying all non-networked devices available to the user through the non-network interface 170, the chooser initialization module 310 will also query the network interface 121 in the background to determine first, what zone of the network 130 the user's workstation 111 resides in, and to determine secondly, what devices and service categories are available and operational within that zone. If an on-network device is completely nonoperative at the time of the query, because for example, its power has been shut off, then it will not appear as a device available within the user's zone. If the device is sufficiently functional to report its presence on the network in response to a query, then it will appear even if there are other problems and/or barriers that will later prevent the user from making a logical connection to the device (e.g., the user doesn't have the correct password).

The on-network service categories that are so discovered by the background query are entered into the service category cache (SCC) 320 with an indication ("Y") that they are available on the network 130 and with a pointer to a corresponding device-choice cache (DCC) 331-334 of each service category. As already mentioned, each DCC is structured to contain a user-recognizable name for each device such as "The Printer of Oz" and a corresponding, machine-recognizable alias such as "root/zone8/dev3".

A service Availability Presentation module (AVPI module) 340 is included within the workstation 111 and operatively coupled to the SCC 320 for presenting on the user's monitor 173 and in response to a user request, a user-centric (u/c) view of available service categories such as the view shown at 210 of FIG. 2A. In a preferred implementation, the u/c AVPI module 340 counts the number of individual devices available in each DCC 331-336, and if the number is a non-zero value below a predefined threshold (e.g. below three) representations of the devices themselves rather than their service category are presented directly by the u/c AVPI 340 to the user 160. An example of this is items 274 and 276 of FIG. 2A.

If the user 160 double-clicks on one of the immediately-choosible items 274-276 the workstation 111 passes control to a connection map module 360 as indicated by control path 341. Referring momentarily to FIG. 3B, the connection map module 360 includes a connection tracking table 365 for keeping track of what connections have or have not been made. The connection map module 360 further includes a connection capability table 367 for keeping track of what devices are attached to the network and of how many logical connections can be made between each class of devices and the user's workstation 111. When the direct-choice path 341 of FIG. 3A is followed, corresponding modifications are made to the connection tracking table 365 to indicate the new connection. If only one logical connection is permitted to the selected device class, the previously connected device is disconnected, and the connection tracking table 365 is updated accordingly.

Referring to FIG. 2A, if the user 160 double-clicks on one of the containerized service icons 234-237, control is passed within workstation 111 to a quick-choice presentation module (u/c CMI module) 350 as indicated by control path 342 of FIG. 3A. The u/c CMI module 350 accesses the device choice cache (DCC) 331-336 of the corresponding service category and displays it on the workstation monitor 173 for viewing by the user 160. The secondary choice panel 240 of FIG. 2B represents an example of what is displayed.

If the user 160 double-clicks on one of the displayed items (234a-234c), that item is highlighted in the display window 242 and control is passed as indicated by control path 343 to the connection map module 360 for making the corresponding connection.

Referring to FIG. 2B, if the user 160 (FIG. 1A) does not see a suitable device in the collection of devices on display, the user 160 can click on one of the Browse or Find buttons to invoke a corresponding Browse or Find function. This action is denoted by control path 344 of FIG. 3A. The workstation 111 is loaded with a default Browse/Find module 370 which comes packaged with the u/c AVPI module 340 and the u/c CMI module 350, but this default Browse/Find module 370 can be superseded by a higher-level Browse/Find module 380 in situations where the higher-level Browse/Find module 380 is also installed on workstation 111. Path 344 passes control to the higher-level Browse/Find module 380 when the latter is present and otherwise passes control to the default Browse/Find module 370. The illustrated example shows the optional presence of an OCE Browse/Find module 380 where "OCE" stands for Open Collaboration Environment™. The latter is a network interfacing environment supported by Apple Computer, Inc. and others. It is of course, within the contemplation of the invention to let the user browse and/or search by means of one or more higher-level Browse/Find modules 380 in addition to or in place of OCE. The appropriate icons for each supported browse/find function should be placed in the upper pane (e.g., 220-{FIG. 2A}, 241-{FIG. 2B}, 710-{FIG. 7}) of each control panel from which the user is to be given access to the supported browse/find functions.

Figure 4A:
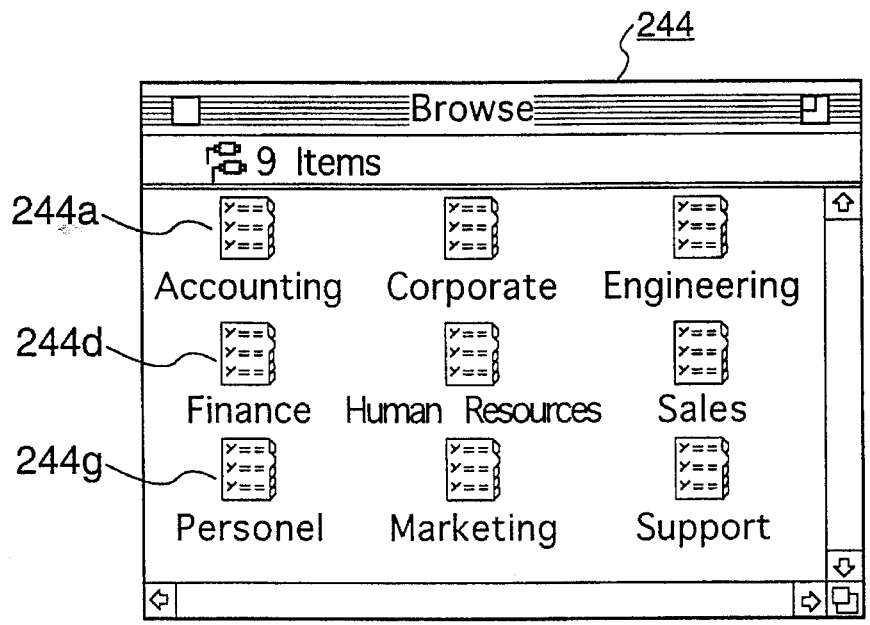
FIG. 4A shows a browse menu that is displayed after a browse button in the menu of FIG. 2B is activated.

FIG. 4A shows an example of a Browse operation provided by the default Browse/Find module 370. A Browse selection panel 244 that conforms to Macintosh™ GUI practice is painted on the screen to present within its scrollable window pane a collection of graphic icons 244a, 244b, etc., representing all zones of the network. In this particular example the zones are divided out to correspond with company departments such as, Accounting, Corporate, Engineering, Finance, Human Resources, Sales, Personnel, Marketing, and Support.

Figure 4B:
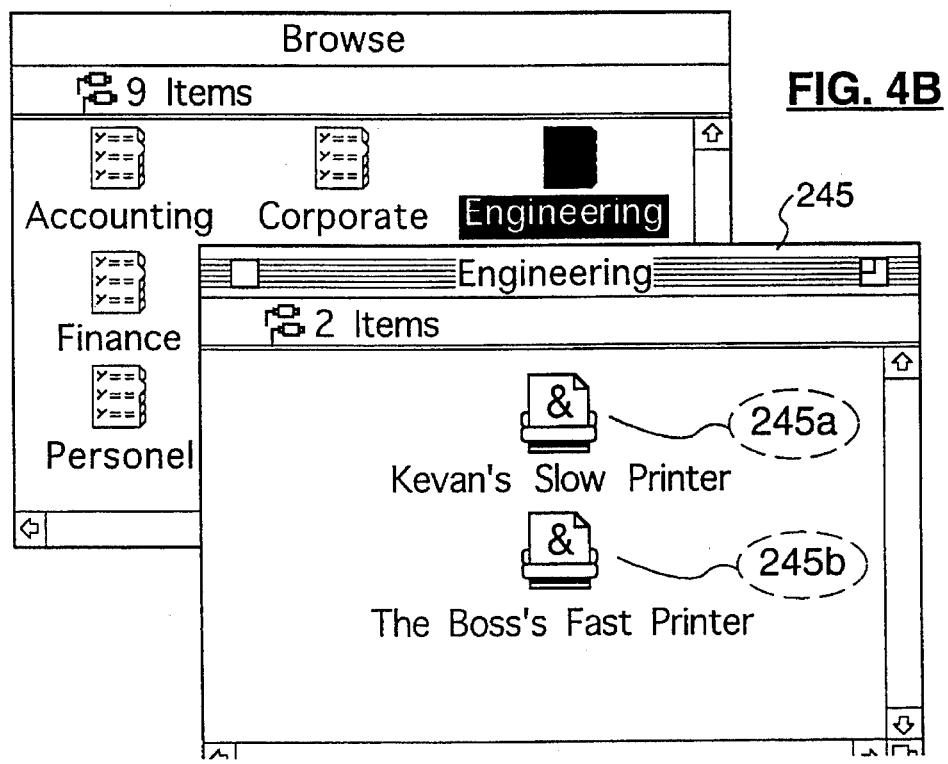
FIG. 4B shows a secondary browse menu that is displayed after a network zone has been selected from the browse menu of FIG. 4A.

Referring to FIG. 4B, when the user 160 double-clicks on one of the displayed zones (e.g. Engineering), the user's workstation 111 scans the network 130 to determine what devices are available in the indicated zone, and at the same time, a device slow-choice panel 245 opens up as shown. This panel 245 also conforms with standard Macintosh™ practice. Panel 245 reveals icons representing devices within both the selected network zone (244c) and the previously selected service category (LaserWriters). It is referred to as the device slow-choice panel 245 because the user 160 had to proceed through the lengthy process of clicking through menu 204 (FIG. 2A), panel 210, the Browse button of panel 240 (FIG. 2B), and the zone button of panel 244 (FIG. 4A) just to get to this point. The user also had to wait for completion of the query activities between his or her workstation 111 and the network manager 110.

As the device slow-choice panel 245 fills, the user 160 can begin to scan through the collection of devices shown in the scrollable window of panel 245 to locate a device for which connection is desired. In the instant illustration there are only two items so scrolling is not required. When the user 160 double-clicks on one of the displayed items 245a, 245b, etc., some additional menus may open up to complete the connection process. There may be passwords or other entries which need to be input before the logical connection is made.

Once logical connection is made, control is passed back to the connection map module 360 as indicated by control path 345 of FIG. 3A. The connection map module 360 makes the appropriate changes to its connection tracking table 365 (FIG. 3B).

At the same time, a new-connection signal 349 is transmitted from the Browse/Find module 370 (or 380) to a quick-choice modifying module 390 also provided within workstation 111. The quick-choice modifying module 390 adds the name and alias of the newly-connected device to the corresponding DCC 331-336. This action is represented by line 391. The next time that the user 160 opens up his or her quick-choice panels (e.g. 240 of FIG. 2B), a graphic icon representing the newly-connected device will be made available for quick connection to.

Figure 5:
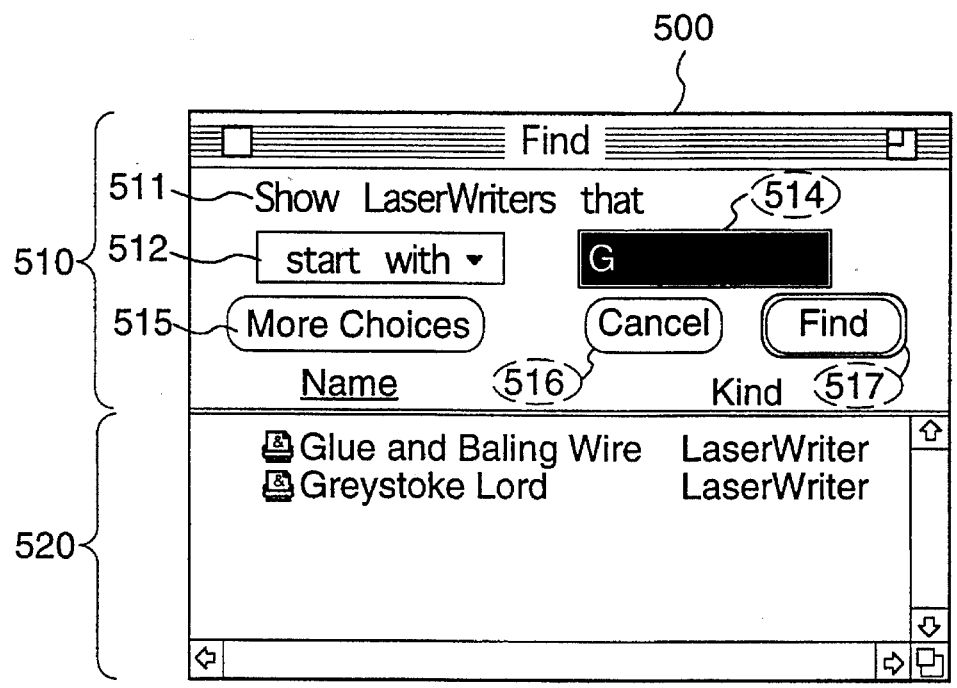
FIG. 5 shows a device find menu.

FIG. 5 shows a Finder panel 500 which is displayed when the user 160 clicks on the find button of panel 240 (FIG. 2B). Finder panel 500 is subdivided into upper and lower panes 510 and 520. A first line 511 indicates that the search function will be constrained to the type of devices known as "LaserWriters". Button 512 changes its contents each time it is clicked on and indicates a basic search strategy. One example is to search for all devices that start with the name pattern shown in area 514. Other search strategies can be keyed on looking for devices whose names end with the string pattern shown in window 514 or contain the string pattern shown in window 514. The contents of window 514 are user-modifiable. Button 515 opens up other filtering tools. Button 516 cancels the find operation while button 517 starts it. Window 520 shows the results of the search function as the search function proceeds.

Note that the query direction line 511 could have said "Show key servers that start with" or "Show file servers that start with". The query direction is dictated by the service category that was first selected in order to open up the secondary choice panel 240 (FIG. 2A).

Referring to FIG. 2A, if the user 160 is not satisfied with the collection of user-centric services displayed to him or her within lower pane 230, the user can actuate either the Browse or Find button from within upper pane 220 to search through the network for other types of services and to connect through this alternate path to a desired device. This alternate path is indicated by line 347 of FIG. 3A. If a connection is completed, the connection map module 360 is informed as indicated by line 345 and a new-connection signal 349 is transmitted to the quick-choice modifying module 390 in order to automatically expand the quick-choice menus. If a new service category had been connected to during this process, the service category cache (SCC) 320 is updated to include the new service category, as indicated by line 392. A new DCC (device choice cache) is generated for a new service category and a name/alias entry is entered into the new DCC to reflect the addition of the newly-connected device.

Figure 6:
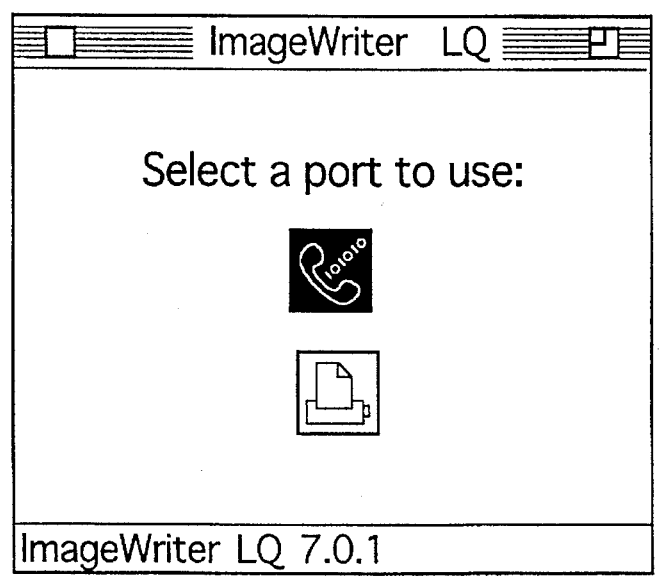
FIG. 6 shows a port select menu.

It is to be understood that each class of devices will have some unique set of entries required for completing a logical connection thereto. FIG. 6 shows one example. During connection to a printer, the user may be asked to select one of a serial or parallel port. Connection to a file-server, which is also referred to as "mounting", may involve several steps including for example, giving a password.

Figure 7:
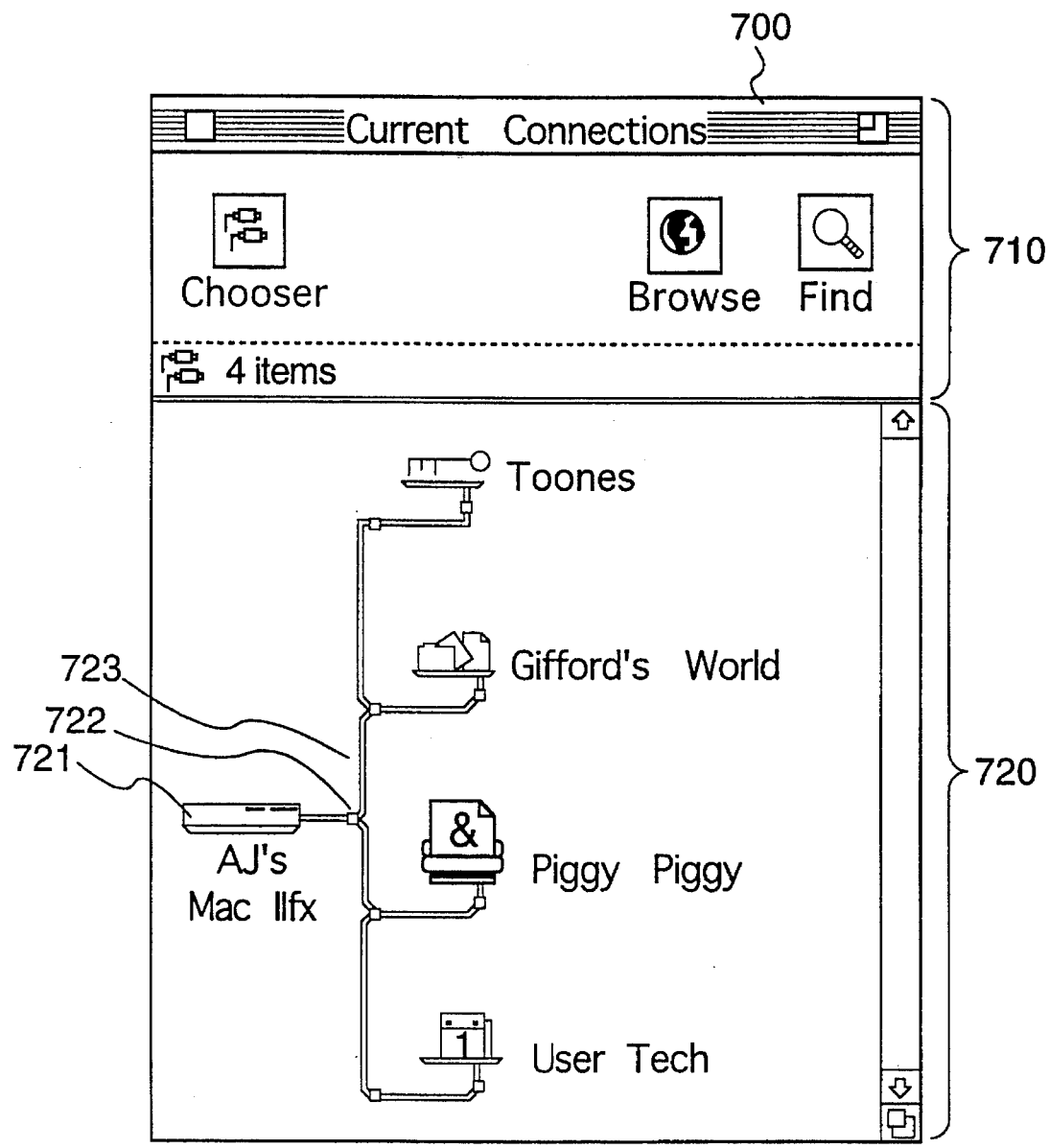
FIG. 7 shows a connection map in accordance with the invention.

After the user 160 has made a number of logical device connections, it can become difficult to comprehend what connections are now in existence. Connections can be made to multiple file servers at the same time. But when a connection to a new printer or new key server is made, the connection to the previous device of that type is broken. The invention provides a simple means for the user to understand what connections are now in existence. FIG. 7 shows a current-connections panel 700 which is displayed when a current-connections function is selected. Panel 700 is painted onto the screen when the Current Connections button in upper pane 220 of FIG. 2A is clicked on. Panel 700 can be invoked by other, independent means however such as from a drop-down menu.

Referring to FIG. 7, the current-connections panel 700 conforms with standard Apple Macintosh™ GUI practice. Panel 700 is subdivided into an upper pane 710 containing access buttons for the chooser function, Browse function and find function. The lower pane 720 shows an easily-understood schematic of the made connections. The user's workstation 111 is represented by an appropriate icon 721 which has the user's name imprinted below it (e.g. "AJ's Mac II FX"). This graphic icon 721 provides a user-centric reference point in two ways. First, it shows the user's name (or other user-centric identification) so that the user can easily realize "this is where I am on the map". Secondly it identifies the specific type of machine, so that in cases where a same user may have multiple workstations coupled to a same monitor 173, the user gets a sense of which physical machine connections are being shown for.

Combinations of small icons representing pipe joint connectors, and other icons representing S, U, or J-shaped connection pipes 723 fan out to the right of icon 721 to show what connections have been made to the user's workstation 111. In the illustrated case, the user's workstation 111 (721) is presently connected to a key server having the name "Toones" to a file server named "Gifford's World", to a laser printer named "Piggy Piggy" and to a Meeting Maker™ named "User Tech". If there are more devices than can fit into the lower connections display pane 720, the side scroll controls may be used to scroll down to see further connections.

The current connections panel 700 may be used to teach a novice workstation user 160 more about the configuration of his or her workstation 111. The combination of graphic icons for each physical device (e.g. 721) coupled by pipes 723 and pipe joints 722 quickly conveys the idea that information can flow only among the connected devices. If a novice user is having problems with certain machine functions, a system administrator can ask the novice user to activate the current connections panel 700 and indicate over the telephone what connections are present. The novice user may be having problems because he or she has failed to connect to a particular key server or has connected to the wrong key server. The system administrator will be able to quickly determine this after the novice user describes his current connections panel 700. Also, other network users may wish to schedule a meeting with the user of workstation 111 (721). These other network users need to know what meeting-scheduler (User Tech) is being used by workstation 111 (721). User 160 can invoke his current connections panel 700 to quickly see what the name of his or her meeting scheduler is.

In addition to displaying connections that have already been made, the current-connections panel 700 can be made responsive to drag-and-drop types of connection making and connection breaking.

For example, if the user has finished utilizing some piece of licensed material and wishes to relinquish his or her key so that other on-network users can have a chance to use the key, the user 160 would drag-and-drop the key-server icon ("Toones") out from the current-connections panel 700 and into the trash-icon 257 (shown in FIG. 2B). The key-server icon ("Toones") and the corresponding pipes (723) and pipe joints (722) will be automatically erased from the lower connections display pane 720 to give the user 160 an immediate and intuitive sense of what has just happened. The connection tracking table 365 (FIG. 3B) will be automatically updated in the background to reflect the change.

The graphic icon 721 representing the user's workstation cannot be dragged out of the lower connections display pane 720. Accordingly, even if there are no logical connections presently made, the current-connections panel 700 will at a minimum always inform the user of the name (e.g., "AJ's"/ and type (e.g., "Mactintosh™ IIfx") of workstation that is currently being used.

In the case where the current-connections panel 700 is to be used for a drag-and-drop type of connection making, it may be that the user 160 prefers to drag a choosible item from a simultaneously open, device slow-choice panel 245 (FIG. 4B) or 520 (FIG. 5) or from a simultaneously open, Quick-Chooser choice panel, 240 or 210 (FIGS. 2B, 2A respectively), into the already-open current-connections panel 700 rather than making choices through the choice panel 245, 240, 210 or 520. In such a case, when the new item is dropped into the lower connections display pane 720, new pipes (723) and pipe joints (722) will be automatically appended to those already displayed in the current-connections panel 700, and the icon or icons representing the new device or devices will be drawn into the displayed connection-map. In this way the user will be provide with an immediate and intuitive sense of what connections have just been made.

The latter, drag-and-drop style of connection-making is particularly useful when the user wishes to simultaneously make connection to a group of devices rather than just one. If the group of devices (e.g., a group of file-servers) are containerized within a folder (and the folder is displayed in an opened choice panel such as 245, 240, 210 or 520), the user 160 can simply drag-and-drop the entire folder into the lower connections display pane 720, and thereby make logical connections to all the containerized devices in one step. This is preferred over double-clicking on the folder in the choice panel (e.g., 245, 240, 210 or 520) to display the folder's internal contents and thereafter individually selecting each item.

It is to be understood that for some types of devices, the system will allow connection to only one. The connection capability table 367 of FIG. 3B has to be consulted prior to granting a user's request for adding a new connection. For example, network protocol may allow a user to connect to only one key-server at a time. If the user tries to drag-and-drop a folder containing plural key-servers into the lower connections display pane 720, a warning will be displayed indicating that this is not allowed and that the user can only connect to one such device at a time.

Connection-making through the current-connections panel 700 is preferably integrated with the choice auto-expansion function 254 of the Quick-Chooser module. In other words, each time a user 160 makes a logical connection to a device by way of a drag-and-drop operation into the current-connections panel 700, the CPU 302 (FIG. 3A) checks the service category cache (SCC) 320 and the appropriate device-choice cache (DCC) 331-336 to see if the device is already listed. If not, appropriate entries are made to the SCC 320 if necessary and to the corresponding DCC 331-336 so that the newly added device(s) and its(/their) service category(/ies) will appear in the Quick-Chooser primary and/or secondary control panels, 210 and 240, when the Quick-Chooser function is later invoked. Although not shown in FIG. 3A, it is to be understood that in such a case, the connection map module 360 will be operatively coupled to the service category cache (SCC) 320 and to the device-choice cache (DCC) 331-336 for carrying out the choice auto-expansion function 254.

As already mentioned, one way to open the current-connections panel 700 is by activating the "Current Connections" button of the upper pane 220 of the Quick-Chooser control panel 210 (FIG. 2A). One can alternatively open the current-connections panel 700 from a roll-away menu such as 204 without first opening the Quick-Chooser control panel 210. The upper connection pane 710 (FIG. 7) then gives the user the option of opening up one or more of the Browse selection panel 244 (FIG. 4A), the Finder panel 500 (FIG. 5) and the Quick-Chooser control panel 210 from within panel 700. So the user can choose more than one route to reach a point where any one or more of panels 700, 244, 500, 210 and 240 are displayed on the user's monitor 173.

An additional feature of the lower connections display pane 720 is to provide detailed information about a particular device to which the user's workstation is already connected. This is done by single-clicking on the icon of the device in interest in order to select it. One can even select the graphic icon 721 representing the user's workstation. Then a roll-away menu such as 204 (FIG. 2A) is opened to show a "Get Info" function or the like (not shown). When the "Get Info" function is invoked, an informational "About_" panel is displayed (e.g., bearing a title such as "About AJ's MacIIfx") and giving the user access to a scrollable or nonscrollable pane containing detailed information about the selected device. For example, if the graphic icon 721 representing the user's workstation is selected, the About_ panel may indicate the date of purchase, the amount of RAM installed, the capacity of the hard disk, and so forth. If the graphic icon representing the key-server ("Toones") is selected, the About_panel may reveal information about the terms of the on-site license. An alternative to getting the same information is to just double-click on the icon of interest in panel 700 rather than doing a one-click select and then going through the roll-away menu to reach the "Get Info" function.

The above disclosure is to be taken as illustrative of the invention, not as limiting its scope or spirit. Numerous modifications and variations will become apparent to those skilled in the art after studying the above disclosure. By way of example, the Browse/Find functions that are invoked from within the user-centric, Quick-Chooser control panel 210 do not have to be of a universal nature, meaning that they immediately span the whole network. The browse/find functions might be tailored to start with zones that are physically or psychologically proximate to the user and then span out over time to zones that are to be perceived as being psychologically further away. By way of further example, user access to various functions described above does not have to be through the illustrated, double-click opening of items to show successive control panels. Instead, drop-down menus, radio-buttons, dialog boxes and/or other GUI or non-GUI mechanisms can be used to give the user the impression that some services/devices are more quickly choosible than others and that these more quickly choosible entities are psychologically proximate to the user regardless of whether or not they are physically proximate to the user.

Given the above disclosure of general concepts and specific embodiments, the scope of protection sought is to be defined by the claims appended hereto.

What is claimed is:

1. An interconnect system for creating logical interconnections between a user's computer and service-providing devices disposed on a network to which the user's computer is coupled, where said network has a first given plurality of service-providing devices disposed thereon and where the computer's user is apt to utilize a first subset of said first given plurality of service-providing devices more frequently than a second subset of said first given plurality of service-providing devices, said system comprising:

a service-category cache for storing a first plurality of service-type definitions corresponding to said first subset of the service-providing devices of the network, where each service-type definition of said first plurality of service-type definitions in the service-category cache defines a type of service that is provided on the network by the first subset of service-providing devices; and a plurality of device-choosing caches each corresponding to a service-type definition found in the service-category cache;

wherein for each of said stored service-type definitions, the service-category cache further includes a corresponding pointer for linking the service-type definition to the corresponding device-choosing cache; and wherein one or more of the device-choosing caches contains a machine-recognizable alias defining a location on the network where there is available a service-providing device that provides a service defined by the corresponding service-type definition.

2. An interconnect system according to claim 1 wherein:

the network includes one or more file-serving devices that are within said first subset of the service-providing devices;

the service-category cache includes a corresponding first set of service-type definitions defining the types of file-server services provided by said one or more file-serving devices; and the plurality of device-choosing caches includes a corresponding first set of device-choosing caches, one for each service-type definition in the first set of service-type definitions.

3. An interconnect system according to claim 2 wherein:

the network includes one or more printing devices that are within said first subset of the service-providing devices;

the service-category cache includes a corresponding second set of service-type definitions defining the types of printing services provided by said one or more printing devices; and the plurality of device-choosing caches includes a corresponding second set of device-choosing caches, one for each service-type definition in the second set of service-type definitions.

4. An interconnect system according to claim 2 wherein:

the network includes one or more key-serving devices that are within said first subset of the service-providing devices;

the service-category cache includes a corresponding second set of service-type definitions defining the types of key-server services provided by said one or more key-serving devices; and the plurality of device-choosing caches includes a corresponding second set of device-choosing caches, one for each service-type definition in the second set of service-type definitions.

5. An interconnect system according to claim 2 wherein:

the network includes one or more meeting-scheduling devices that are within said first subset of the service-providing devices;

the service-category cache includes a corresponding second set of service-type definitions defining the types of meeting-scheduling services provided by said one or more meeting-scheduling devices; and the plurality of device-choosing caches includes a corresponding second set of device-choosing caches, one for each service-type definition in the second set of service-type definitions.

6. An interconnect system according to claim 1 wherein:

the network includes one or more printing devices that are within said first subset of the service-providing devices;

the service-category cache includes a corresponding first set of service-type definitions defining the types of printing services provided by said one or more printing devices; and the plurality of device-choosing caches includes a corresponding first set of device-choosing caches, one for each service-type definition in the first set of service-type definitions.

7. An interconnect system according to claim 1 further comprising:

service availability presentation means, operatively coupled to the service-category cache, for presenting to the user of said computer an indication of the services that are provided on the network only by the first subset of service-providing devices.

8. An interconnect system according to claim 7 wherein the service availability presentation means includes graphical presentation means for presenting to the user a limited collection of one or more graphic icons each graphically and distinctively representing a type of service that is provided on the network by the first subset of service-providing devices.

9. An interconnect system according to claim 8 wherein the each of the service-type graphic icons automatically includes a container symbol about its exterior if the corresponding service-type is supported by at least a predefined number of devices in said first subset of service-providing devices and wherein each service-type graphic icon automatically does not have a container symbol about its exterior if the corresponding service-type is supported by less than said predefined number of devices.

10. An interconnect system according to claim 9 wherein said predefined number is 1 or 2.

11. An interconnect system according to claim 1 wherein:

the user's computer is further operatively coupled to a second given plurality of service-providing devices that are not disposed on said network, said second given plurality of service-providing devices defining a set of non-networked service-providing devices;

the computer's user is apt to utilize a first non-networked subset of said second given plurality of non-networked service-providing devices more frequently than a second non-networked subset of said second given plurality of non-networked service-providing devices;

the service-category cache stores one or more, service-type definitions each defining a type of service that is provided to the user's computer by the corresponding first non-networked subset of non-networked service-providing devices; and for each of said stored service-type definitions corresponding to a non-networked device, the service-category cache includes a corresponding pointer for linking that service-type definition to a corresponding device-choosing cache.

12. An interconnect system according to claim 11 further comprising:

service availability presentation means, operatively coupled to the service-category cache, for presenting to the user of said computer an indication of the combination of services that are provided on the network only by the first subset of networked service-providing devices and the first non-networked subset of non-networked service-providing devices.

13. An interconnect system according to claim 12 wherein the service availability presentation means includes graphical presentation means for presenting to the user a limited collection of one or more graphic icons each graphically and distinctively representing a type of service that is provided to the user's computer both through the network from the first subset of service-providing devices and from the first non-networked subset of non-networked service-providing devices.

14. An interconnect system according to claim 13 wherein the each of the service-type graphic icons automatically includes a container symbol about its exterior if the corresponding service-type is supported by at least a predefined number of devices in said first subset of service-providing devices and wherein each service-type graphic icon does not have a container symbol about its exterior if the corresponding service-type is supported by less than said predefined number of devices.

15. An interconnect system according to claim 11 wherein for each service-type definition of the service category cache, there is a device-choosing cache containing one or more aliases pointing to service-providing devices either on or off said network that provide a service defined by the corresponding service-type definition of the service category cache, each alias being a machine-recognizable code that allows the user's computer to automatically make a logical connection to the corresponding device.

16. An interconnect system according to claim 15 wherein each device-choosing cache further contains for each alias, a corresponding user-recognizable name for the device pointed to by the alias.

17. A user interface system for use in a networked computer system having a display for displaying data items, a data processor in communication with the display, an interactive input device coupled to the processor for allowing a user to point to and select or to otherwise interact with data items shown on the display, a memory, and a network interface coupling the processor to a network of user accessible devices, said network having multiple zones, each zone being capable of containing one or more of the on-network devices, where each on-network device provides a predefined type of service, said user interface system comprising:

user-centric, service availability presentation means, operatively coupled to the network and the display for defining in response to user choices made over time, a subset of the on-network devices as being user-centric devices that are to be perceived by the user as psychologically proximate to the user and for displaying to the user a first collection of data items representing services or service types available only from the subset of user-centric devices; and quick choice means, operatively coupled to the service availability presentation means and responsive to a user selection of one of the first collection of data items, for displaying to the user a second collection of data items representing a subset of user-centric devices that provide the service or service type selected by the user, said second collection not being limited to a specific zone.

18. A user interface system according to claim 17 wherein each zone contains the network interfaces of one or more users, and wherein the user interface system further comprises:

subset initializing means, operatively coupled to the service availability presentation means, for initializing the definition of the user-centric devices as including on-network devices that are within the user's network zone.

19. A user interface system according to claim 18 wherein the networked computer system further has a non-network interface coupling the processor to a one or more off-network, user accessible devices, where each off-network device provides a predefined type of service, and wherein:

the subset initializing means initializes the definition of the user-centric devices as consisting of the one or more off-network, user accessible devices and the on-network devices that are within the user's network zone.

20. A user interface system according to claim 17 wherein the networked computer system further has a non-network interface coupling the processor to a one or more off-network, user accessible devices, where each off-network device provides a predefined type of service, said system comprising:

subset initializing means, operatively coupled to the service availability presentation means, for initializing the definition of the user-centric devices as including the one or more off-network, user accessible devices.

21. A user interface system according to claim 17 further comprising:

presentation modifying means, operatively coupled to the service availability presentation means, for automatically adding to the definition of the user-centric devices, devices not previously defined as user-centric but to which the user nonetheless connects by way of the network.

22. A user interface system according to claim 17 wherein the service availability presentation means displays the first collection of data items as a collection of graphical icons representing the services or service types available from the subset of user-centric devices.

23. A user interface system according to claim 17 wherein the quick choice means displays the second collection of data items as a collection of graphical icons representing the subset of user-centric devices that provide the service or service type selected by the user.

24. A machine-implemented method for allowing a user of a networked computer system to selectively make logical connection to one or more of a plurality of on-network devices provided on a network having multiple zones, each zone containing one or more of the on-network devices, said method comprising the steps of:

(a) defining as user-centric, a subset of the on-network devices that are to be perceived by the user as being psychologically proximate to the user irrespective of the zone containing the user-centric subset, said step of defining being in response to user choices made over time; and (b) displaying to the user a first collection of data items representing services or service types available only from the defined subset of user-centric devices.

25. The machine-implemented method of claim 24 further comprising the step of:

(c) in response to user selection of an item in said first collection of data items, displaying to the user a second collection of data items representing a subset of user-centric devices that provide the service or service type selected by the user.

26. The machine-implemented method of claim 25 further comprising the step of:

(c) in response to user activation of an item in said second collection of data items, making a logical connection to the user-centric device represented by the activated item.

27. The machine implemented method of claim 24 wherein the network is subdivided into a plurality of zones, wherein the user's workstation is assigned to one such zone, and wherein said step (a) of defining a user-centric subset includes:

(a.1) querying the network in a background mode to determine what zone the user's workstation is assigned to and what network devices are assigned to the same zone;

(a.2) defining the services provided by the network devices of the same zone as user-centric services; and (a.3) defining in a storage area of the user's workstation, a service category cache (SCC) listing the user-centric services or service types available from the network devices of the same zone.

28. The machine-implemented method of claim 27 wherein said step (a.1) of querying the network is carried out in a background mode such that the user of the workstation is not aware of step (a.1).

29. The machine-implemented method of claim 27 wherein said step (a.1) of querying the network is carried out when the user's workstation is first connected to the network or when the user's workstation is reset to a state similar to that found the first time the workstation is connected to the network.

30. A machine-implemented method for allowing a user of a networked computer system to selectively make logical connection to one or more of a plurality of on-network devices provided on a network, said method comprising the steps of:

(a) defining as user-centric a subset of the on-network devices that are to be perceived by the user as being psychologically proximate to the user; and (b) displaying to the user a collection of data items representing the defined subset of user-centric devices; and (c) in response to selection by the user of an item in the displayed collection of data items, making a logical connection to the corresponding device.

31. The machine-implemented method of claim 30 further comprising the step of:

each time the user makes a logical connection to a new device not previously defined as belonging to the user-centric subset, automatically adding the new device to the definition of the user-centric subset.

* * * * *